J. H. CHAPPEL.
BIRD-CAGE.

No. 182,558.  Patented Sept. 26, 1876.

Witnesses:
Frank Hirsch
Jno. P. Stark.

Inventor:
John H. Chappel,
by Michael J. Stark
his Attorney

UNITED STATES PATENT OFFICE.

JOHN H. CHAPPEL, OF BROOKLYN, ASSIGNOR OF ONE-HALF OF HIS RIGHT TO JACOB MAY, OF BUFFALO, NEW YORK.

IMPROVEMENT IN BIRD-CAGES.

Specification forming part of Letters Patent No. 182,558, dated September 26, 1876; application filed August 7, 1876.

*To all whom it may concern:*

Be it known that I, JOHN H. CHAPPEL, of Brooklyn, in the county of Kings and State of New York, have invented certain new and useful Improvements in Bird-Cages; and I do hereby declare that the following description, taken in connection with the accompanying sheet of drawings, forms a full, clear, and exact specification.

My invention relates in general to improvements on bird-cages; and it consists in providing the lower end of a cage with a removable open-worked screen attached to the lower band by pivoted clamps or hooks, said screen being provided with a cone-shaped rise or canopy, to which is secured a swivel, by means of which the bird-cage bottom is fastened to said screen, and as a matter of sequence to the cage.

In order to enable others skilled in the art to which my invention appertains to make and use the same, I shall proceed to describe its construction and operation, and thereby refer to the hereinbefore-mentioned drawings, in which—

Figure 1:
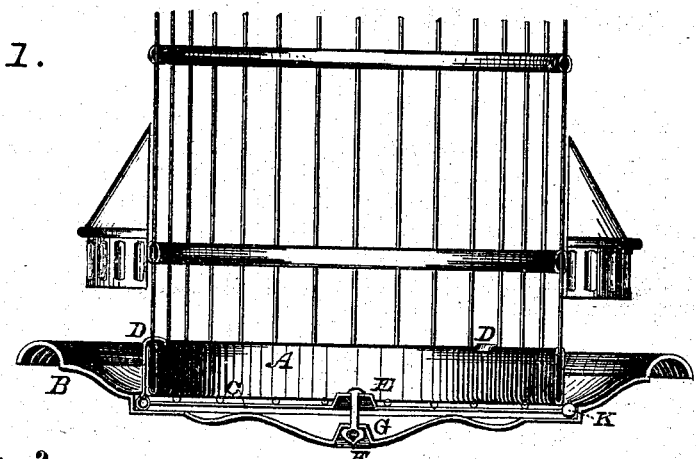
Figure 2:
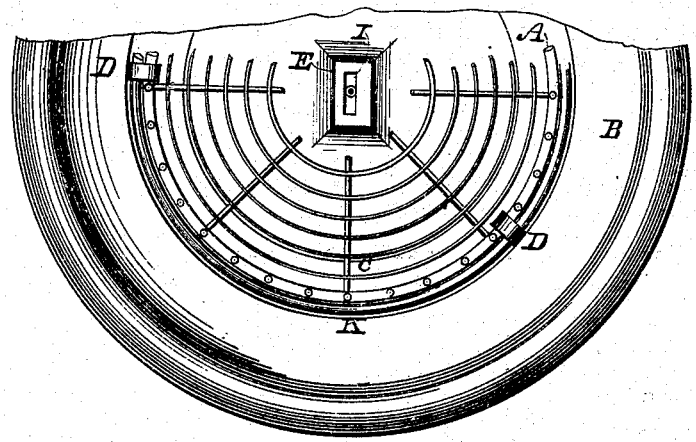

Figure 1 is a longitudinal sectional elevation, and Fig. 2 a plan, of a bird-cage provided with my improvements.

Like letters of reference indicate corresponding parts in all the figures.

A represents the lower band of a cage, and B its bottom. The cage itself is of the usual well-known construction, made in any of the usual styles or shapes, my improvements being applicable to all of them. The bottom opening of this cage is provided with an open-worked or perforated screen, C, attached to the lower band A by means of clamps or hooks D engaging with the upper edge of the band A. This screen is provided centrally with a rise or canopy, E, to which is attached a downwardly-projecting swivel, F. The bottom B is provided with a rise, G, corresponding to that of the screen C. The apex of this rise G is provided with an aperture or slot-hole, I, for the passage of the swivel F. This swivel serves to lock the cage-bottom B to the perforated screen C, which, in turn, is removably attached to the lower band of the cage.

The object of the device heretofore described is to provide a bird-cage with means whereby the bird is prevented from escaping when the cage-bottom has been removed for cleaning or other purposes, without interfering with its picking up of the gravel from the cage-bottom when on the cage; and, furthermore, to enable the removal of the bottom without necessitating the removal of the cage from its hook or other suspending device. This I accomplish by my said device in the following manner: I first attach the open-worked or perforated screen C to the lower band A by means of the hooks D, and then slide the bottom with the slot-hole I over the handle of the swivel F, when, by turning said swivel a quarter-turn, the cage-bottom will be locked to the screen, and as a consequence to the cage. It is desirable that the swivel should be so arranged as to draw the bottom somewhat toward the screen, or vice versa, in order to prevent the bottom from rattling, and thereby disturbing the bird.

The screen C may consist of a perforated sheet of metal, with the canopy stamped or otherwise produced or attached, or it may be made of woven or other wire work, it being provided with a band, K, on its periphery to serve as a pivot for the hooks D, and at the same time to strengthen the screen.

When the bottom is desired to be removed it is simply necessary to turn the swivel in its proper position to correspond with the slot-hole I. This allows the removal of the said bottom without interfering with the screen C, which, in this case, serves as an auxiliary bottom, and prevents the escape of the bird.

The gravel or gravel-paper used in bird-cages is placed upon the bottom B, and can be easily reached by the bird through the open-worked screen C.

In large rectangular or breeding cages I shall provide the screen C with one or more trap-doors, for inserting and removing the bath without removing the front or cage door, which disturbs the setting birds. On such cages I shall also provide the screen C with two swivels, F, and accessories, to more securely hold the base B to said screen C. In fact, if found necessary, two of these swivels may be made in all the screens without changing the nature of my invention.

Having thus fully described my invention, I desire to secure to me by Letters Patent of the United States—

1. The combination, with the band A, of an intermediate or auxiliary bottom or screen, C, and the bottom proper, B, secured to said auxiliary bottom, substantially in the manner and for the use and purpose described.

2. The combination, with the screen C, of the central rise or canopy E, bottom B, with the rise G and slot-hole I, and the swivel F, the whole constructed and arranged substantially as described, for the use and purpose stated.

In testimony whereof I have hereto set my hand and affixed my seal in the presence of two subscribing witnesses.

J. H. CHAPPEL. [L. S.]

Attest:
 ANDREW BROWN,
 SAMUEL ROBINS.